US012638108B2

(12) United States Patent (10) Patent No.: US 12,638,108 B2
Reinhardt (45) Date of Patent: May 26, 2026

(54) MULTI-HOSE ARRANGEMENT

(71) Applicant: Neoperl GmbH, Müllheim (DE)

(72) Inventor: Holger Reinhardt, March/Buchheim (DE)

(73) Assignee: Neoperl GmbH, Müllheim (DE)

( * ) Notice: Subject to any disclaimer, the term of this patent is extended or adjusted under 35 U.S.C. 154(b) by 429 days.

(21) Appl. No.: 18/032,274

(22) PCT Filed: Nov. 11, 2021

(86) PCT No.: PCT/EP2021/081334
§ 371 (c)(1),
(2) Date: Apr. 17, 2023

(87) PCT Pub. No.: WO2022/101319
PCT Pub. Date: May 19, 2022

(65) Prior Publication Data
US 2023/0392723 A1 Dec. 7, 2023

(30) Foreign Application Priority Data

Nov. 13, 2020 (DE) .......................... 202020106539.4

(51) Int. Cl.
*F16L 11/22* (2006.01)
*F16L 39/02* (2006.01)
*E03C 1/04* (2006.01)

(52) U.S. Cl.
CPC .............. *F16L 11/22* (2013.01); *F16L 39/02* (2013.01); *E03C 1/0403* (2013.01)

(58) Field of Classification Search
CPC ..... F16L 11/22; F16L 5/14; F16L 7/02; F16L 39/00; F16L 39/005; F16L 39/02; F16L 39/06
See application file for complete search history.

(56) References Cited

U.S. PATENT DOCUMENTS

| | | | |
|---|---|---|---|
| 236,519 A * | 1/1881 | Walsh ..................... | F16L 39/02 |
| | | | 285/356 |
| 3,590,855 A * | 7/1971 | Woollen ............... | B67D 1/0867 |
| | | | 222/146.1 |
| 4,529,009 A * | 7/1985 | Horner .................... | F16L 11/22 |
| | | | 138/113 |
| 4,754,782 A * | 7/1988 | Grantham ............... | F16L 39/02 |
| | | | 138/109 |
| 4,922,971 A | 5/1990 | Grantham | |

(Continued)

FOREIGN PATENT DOCUMENTS

| | | |
|---|---|---|
| CN | 210687388 U | 6/2020 |
| DE | 2940868 | 6/1984 |

(Continued)

*Primary Examiner* — David Bochna
(74) *Attorney, Agent, or Firm* — Volpe Koenig

(57) ABSTRACT

Multi-hose arrangement (1) having an outer hose (2) and at least one inner hose (3, 3a) disposed in the outer hose (2), and at least one coupling end (4) to which the outer hose (2) and the at least one inner hose (3, 3a) are attached. The at least one coupling end (4) has a flow opening (5) for the outer hose (2), in which flow opening (5) is disposed a receptacle (6) for the at least one inner hose (3, 3a), and this receptacle encompasses the at least one inner hose (3, 3a) on less than a full circumference of the at least one inner hose (3, 3a).

15 Claims, 5 Drawing Sheets

(56) References Cited

U.S. PATENT DOCUMENTS

| | | | | |
|---|---|---|---|---|
| 5,285,744 A * | 2/1994 | Grantham | ............. | F16L 39/005 |
| | | | | 141/59 |
| 5,913,336 A | 6/1999 | Ingram | | |
| 9,074,711 B2 * | 7/2015 | Huang | ................. | F16L 39/005 |
| 10,767,798 B2 * | 9/2020 | Stein | ....................... | F16L 39/00 |
| 2009/0179420 A1 * | 7/2009 | Gai | .......................... | F16L 5/14 |
| | | | | 285/46 |
| 2022/0235889 A1 * | 7/2022 | Reinhardt | .............. | F16L 11/22 |
| 2023/0003006 A1 * | 1/2023 | Kury | ...................... | F16L 39/02 |

FOREIGN PATENT DOCUMENTS

| | | |
|---|---|---|
| DE | 102006053590 | 5/2008 |
| DE | 102017101566 | 6/2018 |
| DE | 202019102837 | 6/2019 |
| GB | 2068490 | 8/1981 |
| WO | 0237016 | 5/2022 |

* cited by examiner

1

MULTI-HOSE ARRANGEMENT

CROSS-REFERENCE TO RELATED APPLICATIONS

This application is a 371 National Phase of PCT/EP2020/081334, filed Nov. 11, 2021, which claims priority to German Patent Application No. 20 2020 106 539.4, filed Nov. 13, 2020, both of which are incorporated herein by reference as if fully set forth.

TECHNICAL FIELD

The invention relates to a multi-hose arrangement having an outer hose and at least one inner hose which is disposed in the outer hose, and at least one coupling end to which the outer hose and the at least one inner hose are attached.

BACKGROUND

In such a multi-hose arrangement, cold and warm water are directed to mixed water in a mutually separated manner, for example, or different waters, for example enriched water, are supplied in a water duct. Multi-hose arrangements of this type are known, for example, from flexible kitchen tap connectors or other hose arrangements.

The production of such a multi-hose arrangement is often associated with great complexity. Moreover, the coupling ends, to which the outer hose and the at least one inner hose are attached, for reasons of construction reduce the flow area through which liquids guided by the outer hose can pass.

SUMMARY

The invention is based on the object of simplifying the production of the multi-hose arrangement described at the outset.

In the hose arrangement of the type mentioned at the outset, the achievement of this object lies in particular in that the at least one coupling end has a flow opening for the outer hose, in which flow opening is disposed a receptacle for the at least one inner hose, wherein this receptacle encompasses the at least one inner hose on less than a full circumference of the at least one inner hose.

This has the advantage that the complex shaping which results when the inner hose is gripped in a fully circumferential manner on the outside is avoided. In this way, the coupling end is easier to produce. Furthermore, less material disposed in the flow cross section of the outer hose is required. An enlarged flow opening of the outer hose is thus provided.

In one design embodiment it is provided that the receptacle encompasses the at least one inner hose on more than half the circumference. It is guaranteed as a result that the inner hose can be fixedly locked in the receptacle, this resulting in a stable disposal of the inner hose relative to the outer hose and the coupling end.

In a further design embodiment it is provided that the flow opening and the receptacle are formed by bores which are offset eccentrically relative to one another. The bore of the receptacle here can be positioned such that the circumference of said bore intersects the circumference of the bore of the flow opening. This represents a particularly simple way of producing the receptacle which encompasses the inner hose on less than a full circumference.

In a further design embodiment it is provided that the at least one inner hose supports a preferably crimped hose stem, in particular having a crimp barrel that is widened from the inside, which is inserted into the receptacle, wherein the hose stem is made from brass or stainless steel, for example.

By inserting the hose stem into the receptacle, wherein the hose stem is preferably composed of a harder material than the hose per se, the relative disposal of the hoses and of the coupling end can be further stabilized.

In a further design embodiment it is provided that the hose stem is held in the receptacle by an interference fit, this leading to the hose stem being securely held in the receptacle, while the interference fit can be implemented without further means and thus in a simple manner.

In a further design embodiment it is provided that a preferably encircling retaining collar which is supported on the coupling end is configured on the hose stem. This has the advantage that the hose stem is able to be locked in a simple manner in a longitudinal direction on the coupling end.

In a further design embodiment it is provided that a depression into which the hose stem or the retaining collar fits is configured in the coupling end, in particular wherein the hose stem or the retaining collar fills a depth of the depression. This has the advantage that the hose stem is likewise able to be locked in a simple manner in a transverse direction, perpendicular to the longitudinal direction, on the coupling end. Furthermore, the hose stem as a result can be inserted in a planar manner into the receptacle, this resulting in a flat sealing face on the receptacle or the hose stem.

In a further design embodiment it is provided that the coupling end has a planar end face, the hose stem and/or the associated crimp barrel and/or the at least one inner hose projecting beyond said planar end face. As a result, a component which is disposed on the planar end face, such as for example a sealing element bearing on the latter, can be attached in an oriented manner to the projecting hose stem and/or the associated crimp barrel and/or the at least one inner hose, or be locked thereon, by means of a corresponding recess or opening.

In a further design embodiment it is provided that a sealing element, which comprises the at least one inner hose along a full circumference, is placed onto the free coupling end. A connection to the inner hose, which is sealed in relation to the outer hose, can be produced in such a manner.

In a further design embodiment it is provided that an external diameter of the at least one inner hose, in particular of the associated hose stem, is smaller than an internal diameter of the flow opening, in particular is at most half the size of the latter. It is guaranteed as a result that the flow opening, even after the inner hose has been attached, has an opening which is connected to the outer hose and which moreover offers space for receiving at least one further inner hose.

In a further design embodiment it is provided that at least two inner hoses are disposed in the outer hose, the respective, preferably identically configured, receptacles of said inner hoses being disposed so as to be mutually spaced apart, in particular mutually opposite, on the flow opening and/or the respective hose stems being configured so as to be separate from one another or connected to one another, in particular integrally configured. As a result, the plurality of inner hoses disposed in the outer hose can in each case be individually attached to the coupling end and removed from the latter. Moreover, the plurality of inner hoses are connected to the coupling end and thus fixedly disposed relative to one another without additional means that reduce the size of the flow opening.

In a further design embodiment it is provided that at least one of the receptacles, into which the hose stems connected to one another, in particular integrally configured, are inserted, encompasses less than half the circumference of the respective inner hose.

For example, one receptacle can in each case be provided for the two inner hoses. The two receptacles can be disposed so as to be mutually opposite in the flow opening. The hose stems connected to one another are supported on one another in the process, so that it is sufficient for the receptacles to be encompassed on less than half the circumference, for example less than a quarter of the circumference, in order to retain the inner hoses in a stable manner in the receptacles. In this way, a smaller bored area is required for the receptacles. Consequently, a larger size of the flow opening can be chosen.

In a further design embodiment it is provided that a center spacing of the at least two inner hoses at the coupling end is at least the size of the or an internal diameter of the flow opening. This has the advantage that the inner hoses cover a smaller area of the flow opening after the two inner hoses have been attached.

In a further design embodiment it is provided that the outer hose has a preferably corrugated inner layer and/or a preferably braided outer layer. A multi-hose arrangement of which the outer hose is able to be flexibly bent as well as being robust is provided in this manner.

In a further design embodiment it is provided that the outer hose is crimped to the coupling end, a simple and fixed connection of the outer hose to the coupling end being guaranteed in this way.

BRIEF DESCRIPTION OF THE DRAWINGS

The invention will be described in more detail hereunder by means of a plurality of preferred exemplary embodiments.

In the Figures.

DETAILED DESCRIPTION

Figure 1:
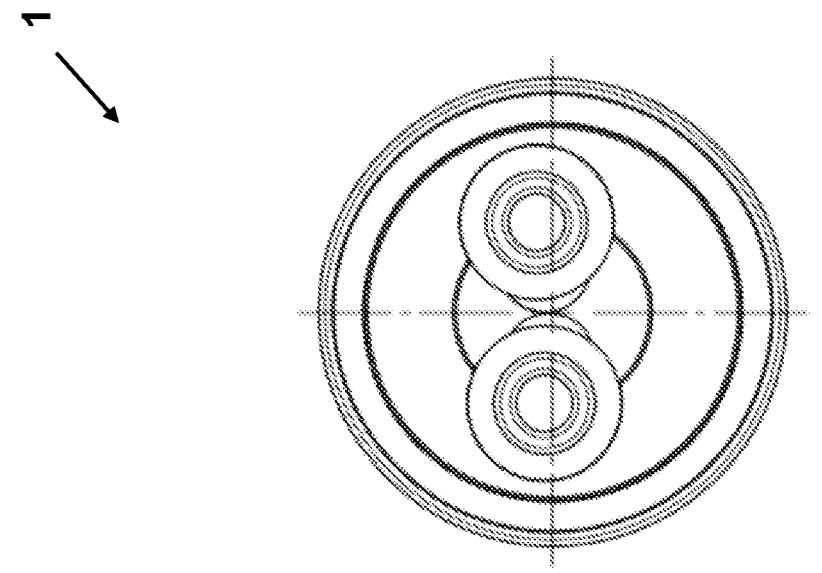
FIG. 1 shows a first multi-hose arrangement in a three-dimensional view and in a view from above.
Figure 1:
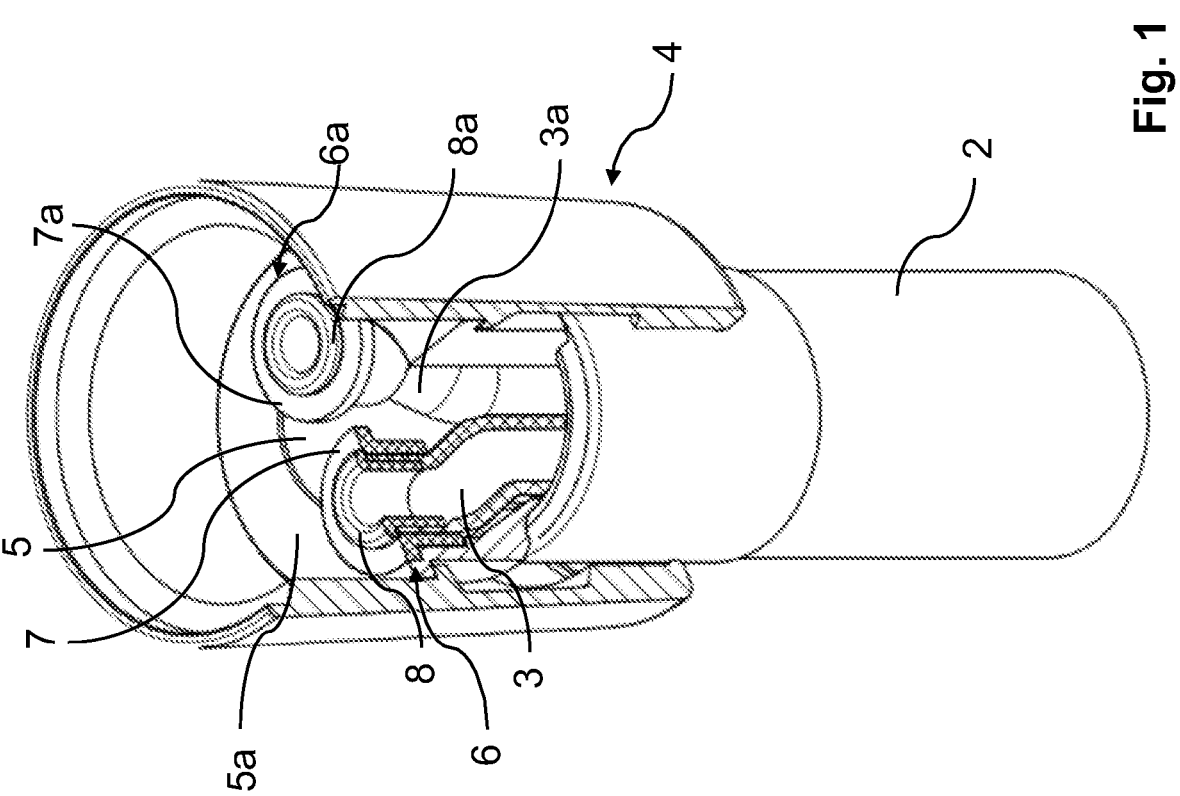

FIG. 1 shows a multi-hose arrangement 1 in a three-dimensional view and in a view from above, having an outer hose 2, two inner hoses 3 and 3a disposed in the outer hose, and a coupling end 4. The outer hose 2 and the inner hoses 3, 3a are attached to the coupling end 4. The outer hose 2 is crimped to the coupling end 4, for example from the outside or by means of plunge-riveting technology. The coupling end 4 furthermore has a flow opening 5 for the outer hose 2. Two receptacles 6, 6a are disposed within the flow opening 5. The receptacles 6, 6a are of identical design. The receptacle 6 encompasses the inner hose 3 on less than a full circumference. Likewise, the receptacle 6a encloses the inner hose 3a on less than a full circumference.

The flow opening 5 is formed by a bore along a central axis of the coupling end 4 in the coupling end 4. The two receptacles 6 and 6a are formed by bores which are in each case offset eccentrically relative to the bore of the flow opening 5. A cross section of the bore of the flow opening 5, which is perpendicular to the central axis, intersects in each case cross sections of the bores of the receptacles 6 and 6a that are perpendicular to the central axis. The receptacles 6 and 6a in this manner represent incomplete or open circular shapes. The receptacles 6 and 6a, by means of the open circular shape of the receptacles 6 and 6a, encompass in each case the two inner hoses 3 and 3a—presently by way of the respective hose stems 7, 7a of the latter—on less than a full circumference, in particular on more than half the circumference, as is illustrated. It is guaranteed as a result that the two inner hoses 3 and 3a can be fixedly attached to the coupling end 4 without said inner hoses 3 and 3a being unintentionally released from the receptacles 6 and 6a. The hose stems 7, 7a, which are plugged on and crimped, are axially pressed into the receptacles 6, 6a in the process. Alternatively, the inner hose 3 or 3a (here in an exemplary manner by way of hose stems 7 and 7a) can be inserted, in particular pressed in, in a radially outward manner into the respective receptacle 6, 6a.

The coupling end has a bore face that encloses the flow opening 5, or a (bore) collar 5a of the flow opening that at least partially comprises the bore/bores of the two receptacles 6 and 6a. The collar 5a shown comprises the bores 6 and 6a on less than a full circumference. In this way, the collar 5a can be of a thinner design than a collar which encloses the bores 6 and 6a in each case on the full circumference thereof. As a result, not only can material be saved and the production of the multi-hose arrangement 1 be simplified but moreover, the flow opening 5 can be enlarged.

Furthermore, a center spacing of the two inner hoses 3 and 3a at the coupling end is at least the size of the or an internal diameter of the flow opening 5. In the example shown, the center spacing of the two inner hoses 3 and 3a is exactly the same size as an internal diameter of the flow opening 5. In other words: the centers of the bores for the receptacles of the two inner hoses 3 and 3a lie opposite one another, here in particular in each case on the periphery of the bore for the flow opening 5. In this arrangement, the receptacles 6 and 6a can be provided for fixedly receiving the two inner hoses 3 and 3a, and for a relatively large flow opening 5.

The inner hose 3 comprises or supports a hose stem 7, the opening of the latter receiving the inner hose 3. The inner hose 3a supports a hose stem 7a which in a corresponding manner is of an identical configuration. The inner hose 3 by means of a crimp barrel 8 is connected to the hose stem 7. The crimp barrel 8 is disposed within the inner hose 3 and within the hose stem 7. The inner hose 3 can be fixedly connected to the hose stem 7 by expanding the crimp barrel 8. To this end, the crimp barrel 8 is produced from a softer material than the hose stem 7. The hose stem 7 is made from a hard metal, brass or stainless steel, for example.

The hose stem 7 is held in the receptacle 6. The hose stem 7 can be held in the receptacle 6 by means of an interference fit, for example. The hose stem 7 moreover has a retaining collar which is supported on the coupling end 4. The retaining collar, or the entire hose stem 7, here fills a clearance or depression within the coupling end 4. The retaining collar, or the hose stem 7, terminates so as to be planar with the collar 5a. In other words: the opening formed by the hose stem 7 and the flow opening 5 lie within a planar face. Yet again in other words: the coupling end has a planar end face. The inner hose 3, or the crimp barrel 8, protrude beyond the planar end face. Alternatively or additionally, the hose stem 7 protrudes beyond the bore face 5*a*.

Figure 2:
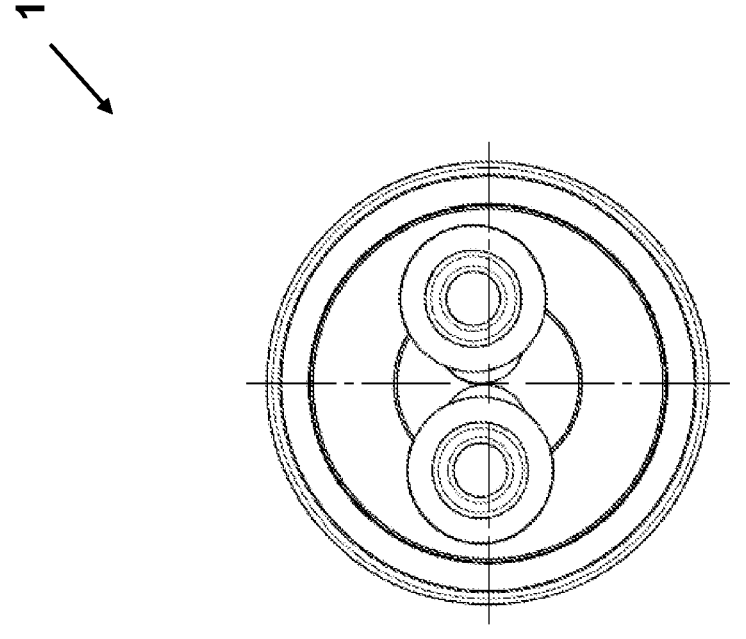
FIG. 2 shows the first multi-hose arrangement having a sealing element, in a three-dimensional view and in a view from above.
Figure 2:
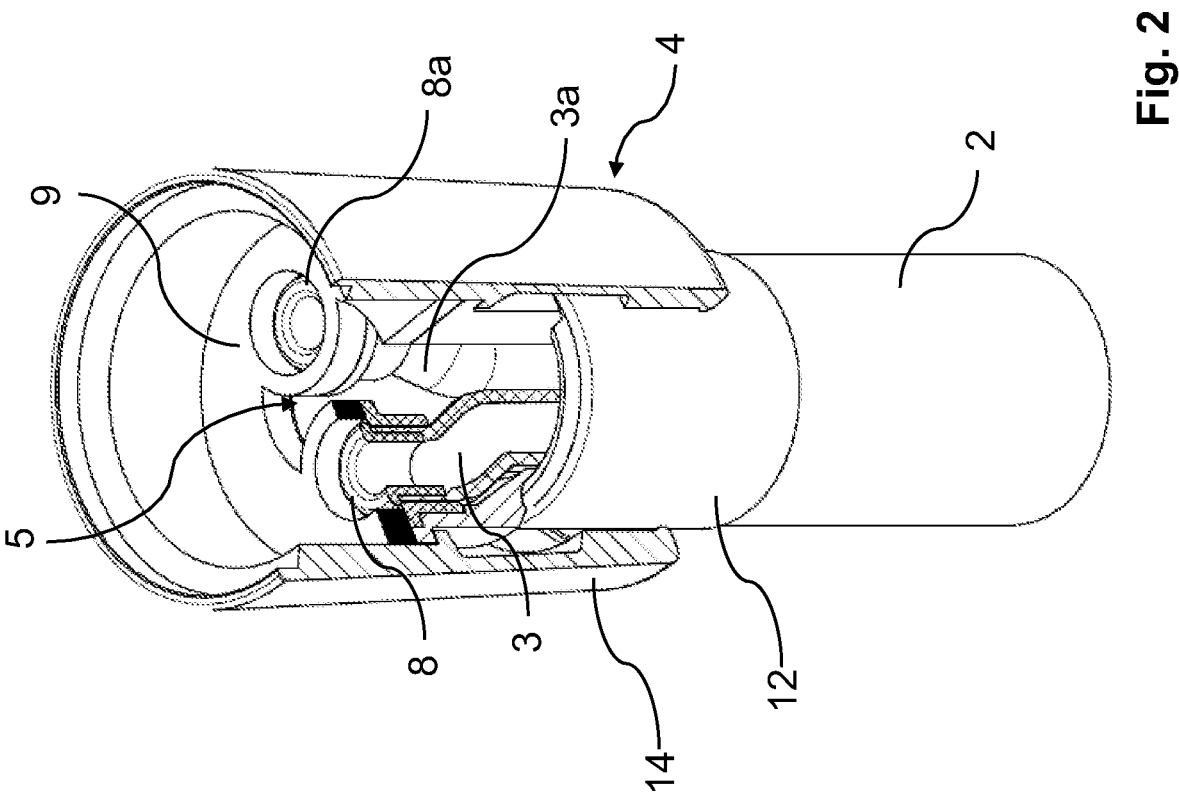

FIG. 2 shows the multi-hose arrangement 1 from FIG. 1. Identical or similar features are provided with the same reference signs. The multi-hose arrangement 1 shown in FIG. 2 comprises a sealing element 9. The sealing element 9 is designed so as to be circular. The external diameter of the sealing element 9 corresponds approximately to the or an available internal diameter of the coupling end 4. The sealing element 9 has a plurality of openings, specifically in each case one opening for the two inner hoses 3 and 3*a*, and one opening for the flow opening 5. The openings of the sealing element 9 for the inner hoses 3 and 3*a* enclose the inner hoses 3 and 3*a* along a full circumference. The internal diameters of the openings of the sealing element 9 for the inner hoses 3 and 3*a* correspond to an external diameter of the respective crimp barrels 8 and 8*a*, in particular to the external diameter of that part of the crimp barrels 8 and 8*a* that protrudes beyond the planar end face of the coupling end 4.

A planar sealing face is provided as a result of the planar end face of the coupling end 4. The sealing function of the sealing element 9 is improved as a result. The openings of the sealing element 9 for the inner hoses 3 and 3*a* enclose the crimp barrels 8, 8*a* or inner hoses 3 and 3*a* that protrude from the planar end face of the coupling end 4. The rotary position of the sealing element 9 relative to the coupling end 4 is fixed in this manner.

The hose stems 7 and 7*a* in FIGS. 1 and 2 are configured separately from one another. Alternatively, the two hose stems 7 and 7*a* can be connected to one another or integrally configured. In other words, a hose stem component can comprise both hose stems 7 and 7*a*. A hose stem component of this type can be inserted simultaneously into both receptacles 6 and 6*a*. The hose stem component is supported by both receptacles 6 and 6*a* in this manner. In other words: aside from the receptacle 6, the hose stem 7 is also supported by the hose stem 7*a*. As a result, the respective receptacles 6 and 6*a* can be designed in such a manner that the latter comprise the inner hoses 3 and 3*a* in each case on less than half the circumference, for example in each case on less than or equal to a quarter of the circumference, without the stability of the hose stems 7 and 7*a* being compromised. Yet again in other words: the receptacles 6 and 6*a* can in each case enclose a central angle of the inner hoses 3 and 3*a* that is less than 180°, for example less than or equal to 90°. In this way, the flow opening 5 can be enlarged while simultaneously guaranteeing that the hose stems 7 and 7*a* are fixedly held in the respective receptacles 6 and 6*a*.

Figure 3:
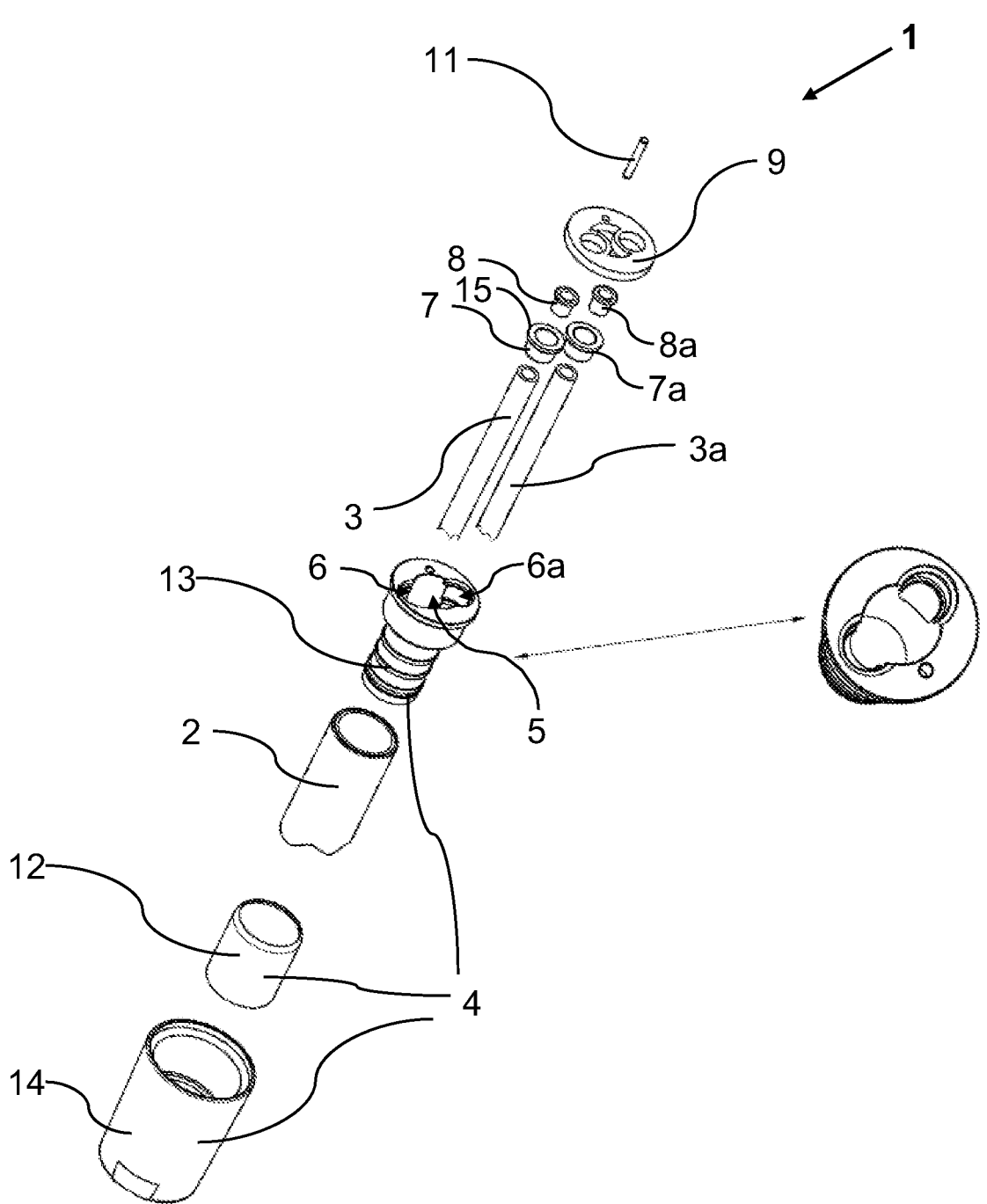
FIG. 3 shows the multi-hose arrangement having the sealing element, in an exploded illustration.

FIG. 3 shows an exploded illustration of the multi-hose assembly 1 from FIG. 2. Identical or similar features are provided with the same reference signs.

Figure 4:
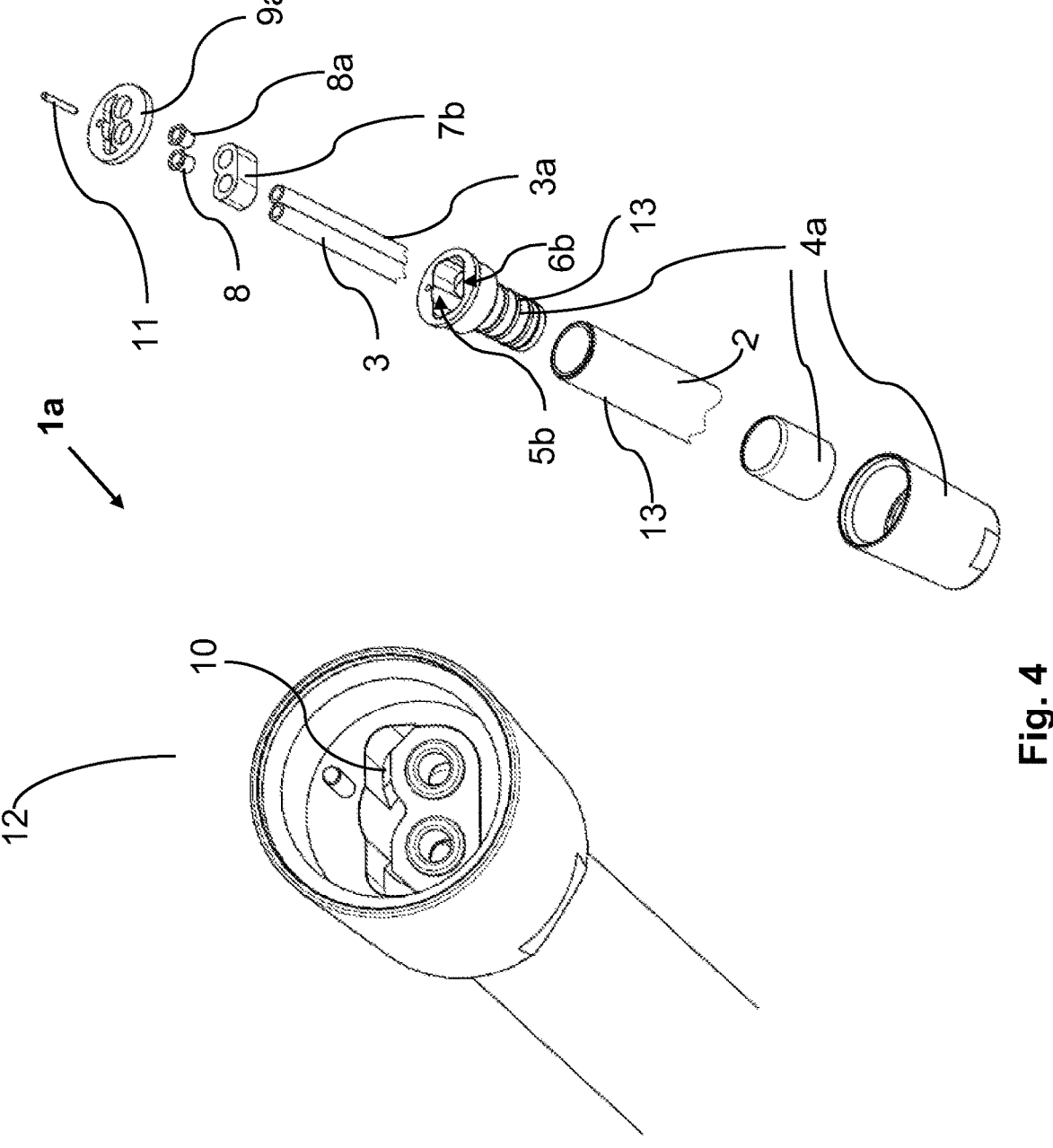
FIG. 4 shows a second multi-hose arrangement in a three-dimensional view and in an exploded illustration.

FIG. 4 shows a three-dimensional view and an exploded illustration of a second exemplary embodiment of a multi-hose arrangement 1*a* similar to the first multi-hose arrangement 1. Identical or similar features are provided with the same reference signs. The multi-hose arrangement 1*a* comprises an outer hose 2 and two inner hoses 3 and 3*a* disposed in the outer hose 2, and a coupling end 4*a*. The coupling end 4*a* has a flow opening 5*b* for the outer hose 2. A receptacle 6*b* for the two inner hoses 3 and 3*a* is disposed in the flow opening 5*b*. In other words: the two inner hoses 3 and 3*a* are disposed in a common receptacle 6*b*. The common receptacle 6*b* encompasses the two inner hoses 3 and 3*a*—here in an exemplary manner by way of a common hose stem 7*b*—on less than a full circumference. As already in the exemplary embodiment shown in FIGS. 1 to 3, the flow opening 5*b* in this manner adjoins directly the receptacle(s) 6 and 6*a*, or 6*b*, of the two inner hoses 3 and 3*a*. As illustrated, the common receptacle 6*b* encloses the two inner hoses 3 and 3*a* in each case on more than half a circumference. In other words: the receptacle 6*a* encloses in each case a central angle of the inner hoses 3 and 3*a* that is less than 360° and more than 180°. Alternatively, the common receptacle 6*b* can enclose the two inner hoses 3 and 3*a* in each case on less than half a circumference.

The multi-hose arrangement 1*a* comprises an integrally configured hose stem component 7*b* which comprises two hose stems. The hose stem component 7*b* corresponds to the two integrally connected hose stems 7 and 7*a*. The hose stems of the hose stem component 7*b*, in the same way as the hose stems 7 and 7*a*, are in each case crimped by a crimp barrel 8, 8*a* expanded from the inside. The hose stem component 7*b* forms a planar end face with the coupling end 4*a*. As has been described in the context of FIGS. 1 to 3, the hose stem component 7*b* can be held in the receptacle 6*b* by way of an interference fit. The hose stem component 7*b* bears on a bearing shoulder 10 of the coupling end 4*a*. Additionally or alternatively, the hose stem component 7*b* fits into a depression of the coupling end 4*a* and/or fills a depth of the depression.

The crimp barrels 8, or the inner hoses 3 and 3*a*, protrude beyond the planar end face. Likewise shown is a sealing element 9*a*. The sealing element 9*a* has in each case openings for the openings of the hose stem component 7*b*, or of the inner hoses 3 and 3*a*, and of the flow opening 5*b*, wherein the openings of the sealing element 9*a* for the inner hoses 3 and 3*a* in turn fit onto the projecting crimp barrels 8 and 8*a*.

Furthermore shown is a locking element 11 which engages in an opening in the coupling end 4*a* as well as into an opening in the sealing element 9*a*, or fills said openings, respectively. In this way, the position, or the rotary position, of the circular sealing element 9*a* relative to the coupling end 4*a* is able to be locked.

Figure 5:
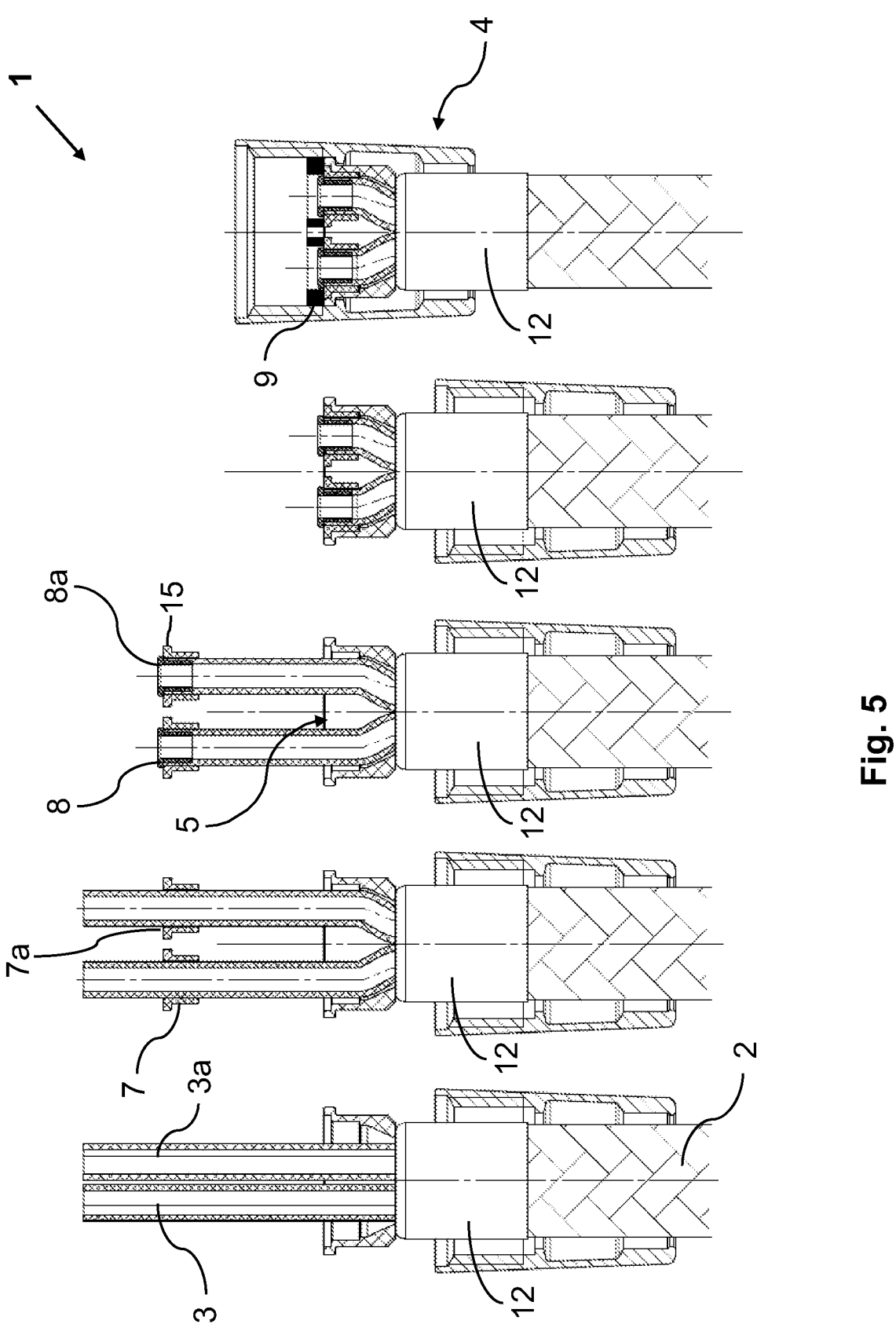
FIG. 5 shows lateral views of the first multi-hose arrangement during a manufacturing process of the first multi-hose arrangement.

FIG. 5 shows a manufacturing process of the multi-hose arrangement 1 shown in FIGS. 1 to 3. Identical or similar features are provided with the same reference signs.

A first step (FIG. 5, left image) comprises the connecting, in particular the crimping, of the outer hose 2 to the coupling end 4. In particular, an outer sleeve 12 can be press-fitted to an inner sleeve 13 of the coupling end 4. The outer hose 2 is disposed between the outer sleeve 12 and the inner sleeve 13.

The first step thus comprises the attaching of the outer sleeve 2 to the coupling end 4, wherein two inner hoses 3 and 3*a* are disposed in the outer hose 2. The first step comprises in particular the introducing of the outer hose 2 into the coupling end 4.

A second step comprises crimping of the inner hoses 3 and 3*a* to in each case one hose stem 7, 7*a* by means of a crimp barrel 8, 8*a*. The second step (i) comprises in particular the introducing of the inner hoses 3 and 3*a* into the hose stems 7 and 7*a* (cf. FIG. 5, second image from the left); (ii) the introducing of the crimp barrels 8 and 8*a* into the inner hoses 3 and 3*a* and into the hose stems 7 and 7*a*; and (iii) the expanding of the crimp barrels 8 and 8*a* for crimping the inner hoses 3 and 3*a* to in each case one hose stem 7, 7*a*. This results in the central image of FIG. 5.

The third step (second image from the right in FIG. 5) comprises in particular the interference-fitting of the hose stems 7, 7*a* of the inner hoses 3 and 3*a* in corresponding receptacles 6 and 6*a* of the coupling end 4.

Subsequently (right image in FIG. 5) a threaded sleeve 14 can be pushed on. The coupling end 4 can also be configured for another type of connection, for example a plug connection or a twist connection.

As is shown in FIG. 5, the outer hose 2 has a braided outer layer. The outer hose 2 furthermore has a corrugated inner layer (not illustrated).

It is a common feature of both exemplary embodiments shown in FIGS. 1 to 5 that the external diameters of the two inner hoses 3 and 3a are in each case smaller than an available internal diameter of the outer hose 2, in particular smaller than half the available internal diameter of the outer hose 2. In this manner, more than one inner hose, in the example shown two inner hoses, can be accommodated in the outer hose 2.

LIST OF REFERENCE SIGNS 1 (First) multi-hose arrangement
1a (Further) multi-hose arrangement
2 Outer hose
3 First inner hose
3a Second inner hose
4 First coupling end
4a Second coupling end
5 First flow opening
5a Collar of the flow opening
5b Second flow opening
6 First receptacle
6a Second receptacle
6b Third, or common, receptacle
7 First hose stem
7a Second hose stem
7b Hose stem (component)
8 First crimp barrel
8a Second crimp barrel
9 First sealing element
9a Second sealing element
10 Bearing shoulder of the coupling end
11 Locking element
12 Outer sleeve
13 Inner sleeve
14 Threaded sleeve
15 Retaining lip

The invention claimed is:

1. A multi-hose arrangement (1, 1a), comprising:
an outer hose (2);
at least one inner hose (3, 3a) disposed in the outer hose (2);
at least one coupling end (4, 4a) to which the outer hose (2) and the at least one inner hose (3, 3a) are attached; and
the at least one coupling end (4, 4a) has a flow opening (5, 5b) for the outer hose (2), a receptacle (6, 6a, 6b) is disposed in the flow opening (5, 5b) for the at least one inner hose (3, 3a), and the receptacle (6, 6a, 6b) encompasses the at least one inner hose (3, 3a) on less than a full circumference of the at least one inner hose (3, 3a),
the at least one inner hose (3, 3a) supports a hose stem (7, 7a, 7b) which is inserted into the receptacle (6, 6a, 6b), a depression is configured in the at least one coupling end (4, 4a), and the hose stem (7, 7a, 7b) fills a depth of the depression in such a way that the at least one coupling end (4, 4a) has a planar end face in which the flow opening (5, 5b) is disposed.

2. The multi-hose arrangement (1, 1a) as claimed in claim 1, wherein the receptacle (6, 6a, 6b) encompasses the at least one inner hose (3, 3a) on more than half the circumference.

3. The multi-hose arrangement (1, 1a) as claimed in claim 1, wherein the flow opening (5) and the receptacle (6, 6a) are formed by bores which are offset eccentrically relative to one another.

4. The multi-hose arrangement (1, 1a) as claimed in claim 1, wherein the hose stem (7, 7a, 7b) is made from brass or stainless steel.

5. The multi-hose arrangement (1, 1a) as claimed in claim 1, wherein the hose stem (7, 7a, 7b) is held in the receptacle (6, 6a, 6b) by an interference fit.

6. The multi-hose arrangement (1, 1a) as claimed in claim 1, further comprising a retaining collar (15) supported on the at least one coupling end (4) configured on the hose stem (7, 7a).

7. The multi-hose arrangement (1, 1a) as claimed in claim 1, wherein the hose stem has an associated crimp barrel (8, 8a), and at least one of the hose stem (7, 7a, 7b), the associated crimp barrel (8, 8a), or the at least one inner hose (3, 3a) project beyond the planar end face of the at least one coupling end (4, 4a).

8. The multi-hose arrangement (1, 1a) as claimed in claim 1, further comprising a sealing element (9, 9a), which encompasses the at least one inner hose (3, 3a) along a full circumference and is placed onto the at least one coupling end (4, 4a).

9. The multi-hose arrangement (1, 1a) as claimed in claim 1, wherein an external diameter of the at least one inner hose (3, 3a) is smaller than an internal diameter of the flow opening (5, 5b).

10. The multi-hose arrangement (1, 1a) as claimed in claim 1, wherein at least two inner hoses (3, 3a) of the at least one inner hose (3, 3a) are disposed in the outer hose (2), each of the at least two inner hoses (3, 3a) having a respective receptacle (6, 6a, 6b), the respective receptacles (6, 6a, 6b) of the at least two inner hoses (3, 3a) being disposed so as to be mutually spaced apart on the flow opening (5, 5b).

11. The multi-hose arrangement (1, 1a) as claimed in claim 10, wherein a center spacing of the at least two inner hoses (3, 3a) at the at least one coupling end (4) is at least a same size of an internal diameter of the flow opening (5).

12. The multi-hose arrangement (1, 1a) as claimed in claim 10, wherein the outer hose (2) has at least one of a corrugated inner layer or a braided outer layer.

13. The multi-hose arrangement (1, 1a) as claimed in claim 10, wherein the respective hose stems (7, 7a, 7b) are configured to be separate from one another.

14. The multi-hose arrangement (1, 1a) as claimed in claim 1, wherein at least two inner hoses (3, 3a) of the at least one inner hose (3, 3a) are disposed in the outer hose (2), wherein each of the at least two inner hoses (3, 3a) supports a respective hose stem (7, 7a, 7b) which is inserted into the receptacle (6b), and wherein the receptacle (6b) encompasses less than half the circumference of at least one of the at least two inner hoses (3, 3a).

15. The multi-hose arrangement (1, 1a) as claimed in claim 1, wherein the outer hose (2) is crimped to the at least one coupling end (4).

* * * * *